(12) United States Patent
Chang et al.

(10) Patent No.: US 10,645,734 B2
(45) Date of Patent: May 5, 2020

(54) MISSION-CRITICAL USER PRIORITY-BASED RANDOM ACCESS METHOD AND APPARATUS FOR COLLISION RESOLUTION IN COEXISTING PS-LTE AND LTE-M NETWORK

(71) Applicant: INHA-INDUSTRY PARTNERSHIP INSTITUTE, Incheon (KR)

(72) Inventors: Kyunghi Chang, Incheon (KR); Ishtiaq Ahmad, Incheon (KR)

(73) Assignee: INHA-INDUSTRY PARTNERSHIP INSTITUTE, Incheon (KR)

( * ) Notice: Subject to any disclaimer, the term of this patent is extended or adjusted under 35 U.S.C. 154(b) by 0 days.

(21) Appl. No.: 16/286,464

(22) Filed: Feb. 26, 2019

(65) Prior Publication Data

US 2020/0113000 A1    Apr. 9, 2020

(30) Foreign Application Priority Data

Oct. 8, 2018    (KR) .......................... 10-2018-0119666

(51) Int. Cl.
*H04W 74/08* (2009.01)
*H04W 48/10* (2009.01)

(52) U.S. Cl.
CPC ....... *H04W 74/0875* (2013.01); *H04W 48/10* (2013.01); *H04W 74/085* (2013.01); *H04W 74/0891* (2013.01)

(58) Field of Classification Search
CPC ........... H04W 74/0875; H04W 74/085; H04W 74/0891; H04W 48/10
See application file for complete search history.

(56) References Cited

U.S. PATENT DOCUMENTS

2014/0119331 A1* 5/2014 Ji ........................... H04W 72/02
370/330

OTHER PUBLICATIONS

Shipon et al.; "LTE/LTE-A Random Access for Massive Machine-Type Communications in Smart Cities"; IEEE Communications Magazine; vol. 55 Issue 1; Jan. 2017; 8 pages.

* cited by examiner

*Primary Examiner* — Steven H Nguyen
(74) *Attorney, Agent, or Firm* — BakerHostetler

(57) ABSTRACT

Proposed are a mission-critical user priority-based random access method and apparatus for a collision resolution in a coexisting PS-LTE and LTE-M network. The MCHP-RA method includes broadcasting information as part of a system information block (SIB) 2 in order for an eNB to allocate a random access channel (RACH) slot in a network environment in which an LTE-based public safety (PS-LTE) network and an LTE-based marine (LTE-M) network coexist, selecting an emergency slot as a next RACH slot when the number of mission-critical high priority-based user equipments (MCHP UEs) is greater than a predefined threshold and processing the MCHP UEs during a random access procedure, and selecting a normal slot as a next RACH slot when the number of MCHP UEs is smaller than a predefined threshold and processing the MCHP UEs, wherein the eNB may allocate the RACH slot based on configurations in order to prevent a preamble collision.

6 Claims, 10 Drawing Sheets

MISSION-CRITICAL USER PRIORITY-BASED RANDOM ACCESS METHOD AND APPARATUS FOR COLLISION RESOLUTION IN COEXISTING PS-LTE AND LTE-M NETWORK

CROSS REFERENCE TO RELATED APPLICATION

This application is based on and claims priority under 35 U.S.C. 119 to Korean Patent Application No. 10-2018-0119666, filed on Oct. 8, 2018, in the Korean Intellectual Property Office, the disclosures of which is herein incorporated by reference in their entireties.

BACKGROUND OF THE INVENTION

1. Technical Field

The following embodiments relate to a mission-critical user priority-based random access method and apparatus for a collision resolution in a coexisting PS-LTE and LTE-M network.

2. Description of the Related Art

In modern cellular networks, a base station transmits a request using a random access channel (RACH), establishes a connection, and performs initial access on a network. In general, a random access (RA) procedure between a user equipment (UE) and a base station (BS or eNB) includes four types of message handshake methods or steps. Four types of messages include a preamble transmission (UE to eNB), a random access response (eNB to UE), a connection request (UE to eNB), and a connection setup (eNB to UE). In this case, the eNB may be a LTE-based public safety (PS-LTE) eNB. The exchange of shared transmission resources occurs in the first two messages, and dedicated logical channels (specifically, for the UE) are exchanged in the remaining two messages. A random access attempt is completed when the exchange of the four messages is successfully performed. In the 3GPP LTE system, random access (RA) is a major step for data transfer.

In the 3GPP-LTE system, when uplink (UL) is not synchronized, contention-based random access occurs in three cases, such as initial access to a network, radio resource connection (RRC) recovery, and data transfer and location identifications. The contention-based RA procedure is based on the slotted ALOHA (non-patent document 1). In this case, all UEs transmit their preambles in the first accessible RA slots. In the 3GPP LTE system, RACH management is a very quite difficult job, specifically, when RACH overload occurs due to irregular and enormous UE transmissions. This means that UEs transmit randomly selected preambles over a shared channel by requesting channel access from a BS.

In the 3GPP LTE system, there is a good possibility that multiple UEs may select the same preamble, which is considered to be a collision, because the number of random access preambles is restricted. Furthermore, if enormous UEs attempt access to an RACH within a short time, a collision rate will be high, resulting in longer access delay.

In order to solve such an RACH overload problem, many solutions have been proposed. In general, a random access method is focused on the efficient usage (i.e., improvement in successful transmission attempts, less preamble collisions) of the RACH. The guideline is to maximize RACH success attempts, reduce the collision probability, and minimize access delay. In the conventional many proposals, the access probability is broadcasted to prevent users from accessing an RACH based on some probability. In this case, a main objective is a determination of the best access probability. However, some studies proposed collision avoidance schemes that limit the arrival rate of access attempts. In this case, the quality of service (QoS) requirements of a user may not be fulfilled because the access delay time is longer. Furthermore, there were many proposals for solving the resource management problem of mission-critical priority users, but the conventional technologies do not include any proposal available to take care the requirements of mission-critical users during the random access procedure for coexisting PS-LTE and LTE-M networks.

As described above, the RACH has been designed to establish a connection between a UE and a network, but the current long-term evolution (LTE) standard has limitations to the provision of RACH resources to enormous UE connections. If a connection request is transmitted to multiple UEs at the same time, a preamble collision and significant access delay occur, degrading system performance. Many previous researches have been carried out to control such overload, but there are no such proposals to resolve the RACH overload issues for mission-critical high priority (MCHP) UEs for the coexistence of an LTE-based public safety (PS-LTE) and an LTE-based marine network (LTE-M).

Accordingly, when MCHP users are present, immense interests and practical researches are urgently required to resolve the UE initial access problem in the random access procedure.

SUMMARY OF THE INVENTION

Embodiments describe a mission-critical user priority-based random access method and apparatus for a collision resolution in a coexisting PS-LTE and LTE-M network and, more particularly, provide an efficient mission-critical high priority-based random access technology in which PS-LTE and LTE-M networks may coexist.

Furthermore, embodiments provide a mission-critical user priority-based random access method and apparatus for a collision resolution in a coexisting PS-LTE and LTE-M network, wherein when multiple UEs attempt access for the network coexistence of a PS-LTE network and LTE-M network, RA preambles can be efficiently allocated to mission-critical high priority-based user equipments (MCHP UEs) in order to prevent a preamble collision.

A mission-critical user priority-based random access method according to an embodiment includes broadcasting information as part of a system information block (SIB) 2 in order for an eNB to allocate a random access channel (RACH) slot in a network environment in which an LTE-based public safety (PS-LTE) network and an LTE-based marine (LTE-M) network coexist, selecting an emergency slot as a next RACH slot when the number of mission-critical high priority-based user equipments (MCHP UEs) is greater than a predefined threshold and processing the MCHP UEs during a random access procedure, and selecting a normal slot as a next RACH slot when the number of MCHP UEs is smaller than a predefined threshold and processing the MCHP UEs. The eNB may allocate the RACH slot based on configurations in order to prevent a preamble collision.

Furthermore, broadcasting information as part of a system information block (SIB) 2 in order for an eNB to allocate a random access channel (RACH) slot may include checking whether the MCHP UE has received the SIB2 including an RACH configuration whenever the UE starts a random access procedure, and broadcasting the information as part of the SIB2 in order to allocate a next RACH slot based on current slot statistics when the UE receives the SIB2.

Furthermore, broadcasting information as part of a system information block (SIB) 2 in order for an eNB to allocate a random access channel (RACH) slot may include marking an emergency flag as 1 by inserting 1 bit into the SIB2 for the emergency slot based on a specific pattern of the RACH slot, reserving at least two preambles for MCHP UEs within each RACH slot, and updating the random access preamble pool for the MCHP UEs in a next RACH slot based on RACH slot statistics.

Furthermore, the random access method further includes configuring a condition for preamble allocation to the MCHP UEs. Configuring a condition for preamble allocation to the MCHP UEs may include configuring the condition for preamble allocation when the number of MCHP UEs successful in random access is greater than a predefined threshold for the number of MCHP UEs.

A mission-critical user priority-based random access apparatus according to another embodiment includes a broadcasting unit configured to broadcast information as part of a system information block (SIB) 2 in order for an eNB to allocate a random access channel (RACH) slot in a network environment in which an LTE-based public safety (PS-LTE) network and an LTE-based marine (LTE-M) network coexist, an emergency slot unit configured to select an emergency slot as a next RACH slot when the number of mission-critical high priority-based user equipments (MCHP UEs) is greater than a predefined threshold and process the MCHP UEs during a random access procedure, and a normal slot unit configured to select a normal slot as a next RACH slot when the number of MCHP UEs is smaller than a predefined threshold and processing the MCHP UEs. The eNB may allocate the RACH slot based on configurations in order to prevent a preamble collision.

The random access apparatus further includes a preamble allocation condition configuration unit configured to configure a condition for preamble allocation to the MCHP UEs. Configuring a condition for preamble allocation to the MCHP UEs may include configuring the condition for preamble allocation when the number of MCHP UEs successful in random access is greater than a predefined threshold for the number of MCHP UEs.

DETAILED DESCRIPTION

Figure 1:
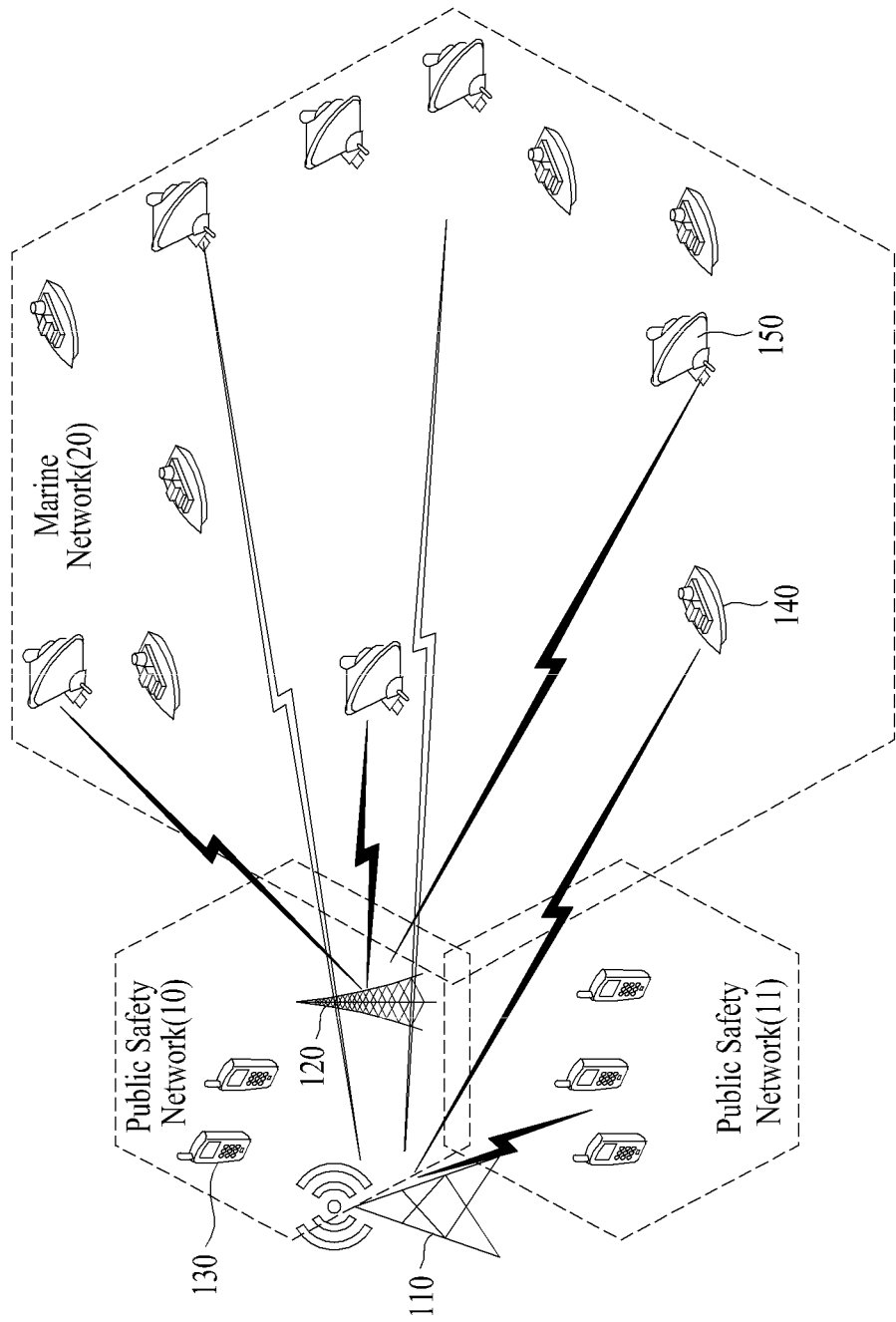
FIG. 1 is a diagram for illustrating a system model for a coexisting PS-LTE and LTE-M network according to an embodiment.

Hereinafter, embodiments of the present invention are described in detail with reference to the accompanying drawings. However, the described embodiments may be modified in various other forms, and the scope of the present invention is not restricted by the following embodiments. Furthermore, the embodiments of the present invention are intended to fully describe the present invention to a person having ordinary knowledge in the art to which the present invention pertains. In the drawings, the shapes, sizes, etc. of components in the drawings may be exaggerated to make the description clear.

In an embodiment of the present invention, there is proposed a mission-critical user priority-based random access method for a collision resolution when a PS-LTE network and an LTE-M network coexist.

In accordance with an embodiment of the present invention, when multiple UEs attempt access for the network coexistence of a PS-LTE network and an LTE-M network, random access preambles may be efficiently allocated to the MCHP UEs. A PS-LTE UE must be provided with channel access based on priority during an initial access process because the PS-LTE US is a mission-critical priority user. The proposed mission-critical high priority-based random access (MCHP-RA) method includes dynamically allocating a random access preamble to an MCHP UE and providing an optimal channel access opportunity based on the number of activated MCHP users. Hereinafter, a UE may be interchangeably used with a user simply.

In relation to this, an MCHP UE threshold is set in order to know that how many MCHP UEs obtain successful attempts in a current random access slot and whether a threshold for the MCHP UEs is exceeded according to the statistics of the current random access slot. In this case, more preambles are allocated to the MCHP UEs for a next random access slot. Likewise, if the MCHP UEs are less activated compared to the threshold, corresponding random access preamble allocation is reduced.

An embodiment of the present invention handles an MCHP UE that fulfills mission-critical requirements while resolving the RACH overload problem in an optimal way and allocating random access preambles. Furthermore, the proposed MCHP-RA method is the best method for the coexistence of the two LTE networks. For example, in the Republic of Korea, the 700-MHz frequency band is allocated to the PS-LTE network, but the same band is also allocated to the LTE-M network. Accordingly, the proposed MCHP-RA method is quite effective to secure the MCHP UEs during the random access procedure. Furthermore, the proposed MCHP-RA method is analyzed by proposing performance measurement criteria, such as successful attempts, the number of collisions and access delay, and thus simulation results thereof validate the superiority of the proposed method compare to the conventional method.

Proposed hereinafter is a system model for the coexistence of the PS-LTE and LTE-M networks. Furthermore, the proposed MCHP-RA method is described in detail and performance thereof is evaluated.

FIG. 1 is a diagram for illustrating a system model for a coexisting PS-LTE and LTE-M network according to an embodiment.

Referring to FIG. 1, in an embodiment of the present invention, an uplink system in which a PS-LTE network and an LTE-M network coexist is taken into consideration. One example of the uplink system is described more specifically.

In the uplink system in which the PS-LTE network and the LTE-M network coexist by a PS-LTE eNB 110 and an LTE-M eNB 120, one PS-LTE site (P=1) 10, 11 configuring an L hexagonal sector ($L_p$=3) and one LTE-M site (M=1) 20 configuring an L hexagonal sector ($L_m$=2) are deployed. Only two sectors are considered for the PS-LTE site 10, 11, and only one sector is assumed for the LTE-M site 20. In this case, the PS-LTE UE 130 may correspond to the fire fighters, police, maritime police 140 referred as "MCHP users" ($U_{MCHP}$) herein. The other LTE-M UEs 150 may be routers that are mounted on the ships, named as normal users ($U_{NORMAL}$) herein.

In this case, a desired signal may be indicated between the PS-LTE eNB 110 and the PS-LTE UE 130 and between the PS-LTE eNB 110 and the maritime police 140, and an interfering signal may be indicated between the PS-LTE eNB 110 and the LTE-M UE 150 with reference to the PS-LTE eNB 110. Furthermore, a desired signal may be indicated between the LTE-M eNB 120 and the LTE-M UE 150 with reference to the LTE-M eNB 120.

The coexisting PS-LTE and LTE-M network uses a full system bandwidth. In Orthogonal frequency domain multiple access (OFDMA), time is divided into fixed length radio frames. Each frame may be subdivided into several sub-frames. Preamble transmission may be limited to some sub-frames for a random access procedure designated as a random access slot. In the LTE system, random access resources are called random access opportunities (RAO). The RAO is a random access preamble allocated to each frequency band in a random access slot. In the random access slot, the total RAOs are equal to the number of preambles assigned to respective frequency bands multiplied by the number of frequency bands. For clarity, a single frequency band is considered herein. The terms "preamble" and "RAO" may be interchangeably used. Accordingly, users randomly select RAOs in a random access slot and transmit connection requests to a network.

A slotted RACH operation is assumed wherein time slots are denoted with an index (i≥0). An active user ($U_{MCHP}$+$U_{NORMAL}$=$U_{Active}$) attempts to access a channel for each random access slot i. An eNB may generate RAOs denoted by R in each random access slot. The user may randomly select an RAO of valid RAOs denoted by R, and may transmit a preamble in order to establishes a connection with the eNB. When the user obtains a successful attempt, there is no transmission through an RACH. However, a user who has experienced a collision will transmit a preamble in a next RACH slot.

A typical transmission model for the coexisting PS-LTE and LTE-M network may be represented in the following equation.

$$\overline{U}_i = \langle U_i[\text{MCHP\_UEs}, \text{Normal\_UEs}] \rangle \quad \text{[Equation 1]}$$

In Equation 1, $U_i[n]$, together with $n \in (U_{MCHP}, U_{Normal})$, represents the number of users who attempt to establish the connection with the network in a random access slot i. For simplicity, a backoff window is neglected, and it is assumed that all the users transmit preambles in respective random access slots (i.e., no backoff). Accordingly, the number of active users engaged to establish the connection is equal to the sum of the number of collisions and successful attempts. That is, this may be represented in the following equation.

$$U_{i,C}[n] + U_{i,S}[n] = U_i[n] \,\forall i \geq 0, n \in (U_{MCHP}, U_{Normal}) \quad \text{[Equation 2]}$$

In Equation 2, $U_{i,C}[n]$ and $U_{i,S}[n]$ are random variables to represent the number of collisions and successful attempts, respectively, in a random access slot i.

For clarity, the expressions of failure and successful attempts in the RACH slot under the coexistence of the PS-LTE and LTE-M networks may be further elaborated. This may be represented in the following equation.

$$U_{i,C}[n] + U_{i,S}[n] = \left( \sum_{n=1}^{U_{Active}} u_{i,C}(n) + \sum_{n=1}^{U_{Active}} u_{i,S}(n) \right) = U_i[n] \quad \text{[Equation 3]}$$

$$\begin{cases} \forall i \geq 0, n \in (U_{MCHP}, U_{Normal}) \\ U_{Active} = U_{Total} = U_{MCHP} + U_{Normal} \end{cases}$$

In Equation 3, $U_{Active}$ is a total number of active users that attempt to establish the connection with the network in a current random access slot.

A user may transmit a randomly selected preamble through a common channel shared by all the users. Users having the same preamble identity (ID) obtain the access successfully, whereas users having correlated preamble IDs are counted as a failure. For simplicity, only the preamble transmission step is considered in this scenario. The reason for this is that a main concern is to handle MCHP UEs during a random access procedure. Accordingly, users who have completed the step 1 (preamble transmission) have their preamble transmissions not collided and are detected by the eNB and indicated as random access responses (RARs). Accordingly, the execution of the remaining step of the random access procedure for the coexisting PS-LTE and LTE-M network, together with the backoff window, through the response message is neglected.

A radio propagation model may be configured with a free space path loss (FSPL) calculated as in the following equation.

$$FSPL = \left(\frac{4\pi d}{\lambda}\right)^2 \quad \text{[Equation 4]}$$

$$= \left(\frac{4\pi d}{c}\right)^2$$

In Equation 4, $\lambda$ is a signal frequency (in Hz), d is the distance from a transmitter (in meters), and c is the speed of light in vacuum (meters per second)

Hereinafter, a mission-critical priority-based random access method proposed for a collision resolution is described specifically. A random access slot is described prior to the details of the proposed method.

Figure 2:
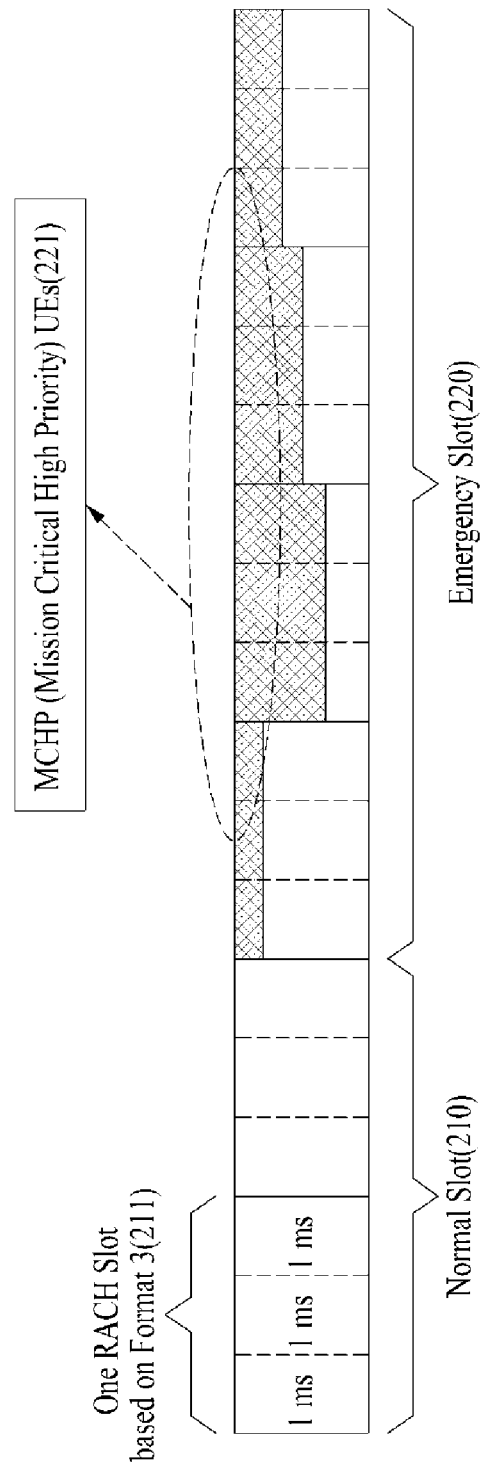
FIG. 2 is a diagram for illustrating a random access slot according to an embodiment.

FIG. 2 is a diagram for illustrating a random access slot according to an embodiment.

Referring to FIG. 2, the random access slot shows a physical resource of an LTE system called a physical random access channel (PRACH). As shown in FIG. 2, in accordance with one embodiment, for the coexistence of PS-LTE and LTE-M networks, two types of RACH slots, such as a normal slot 210 and an emergency slot 220, may be used.

The normal RACH slot (simply called a normal slot) 210 is a typical random access slot defined by 3GPP. This means that the normal RACH slot 210 continues with the 3GPP LTE-based random access procedure. In the RACH slot, random access preambles are mapped and transmitted to an eNB. The RACH slot includes six resources blocks in the frequency domain, whereas it depends on RACH coverage with respect to the preamble format in the time domain.

3GPP specifies four preamble formats. That is, 3GPP specifies a preamble format 0 (supported cell size: 15 km), a preamble format 1 (supported cell size: 75 km), a preamble format 2 (supported cell size: 30 km), and a preamble format 3 (size exceeding a supported cell of 100 km). In an embodiment of the present invention, the preamble format 3 may be adopted because the coverage area of the LTE-M eNB exceeds 100 km.

All the 64 preambles are mapped to the RACH slot. This means that an eNB reserves R-available random access opportunities (RAOs) in each random access slot. The RACH slot is based on the format 3 (211), so the time duration of the normal slot 210 is 3 ms.

The emergency random access slot (simply called an emergency slot) 220 handles MCHP UEs during a random access procedure for the coexistence of the PS-LTE and LTE-M networks.

A system information block 2 (SIB2) has preamble information which is broadcasted by an eNB in a periodic manner. Part of the SIB2 contains all types of random access parameter information, such as an RA slot, a preamble format and a preamble configuration. Accordingly, the eNB may allocate preambles while allocating RACH slots.

The allocation of preambles to MCHP UEs in a next RACH slot is based on RACH slot statistics. In order to mark the RA preamble indices of the MCHP UEs, the eNB marks an emergency flag as 1 (default value is 0) by adding 1 bit to the SIB2 with respect to the emergency slot 220 following a specific pattern of the RACH slot. The emergency slot 220 is also based on the preamble format 3, and the time duration of the emergency slot 220 is up to 3 ms. The presence of resources allocated to MCHP UEs 221 is shown in FIG. 2.

When the number of MCHP UEs is greater than a predefined threshold, more preambles are reserve in a next RACH slot (called emergency slot 220) for MCHP UEs. In this way, higher priority can be allocated to mission-critical users while allocating RACH resources to them.

An MCHP-RA method for securing mission-critical users having high priority and reducing a preamble collision between them during a random access procedure is described below.

Figure 3:
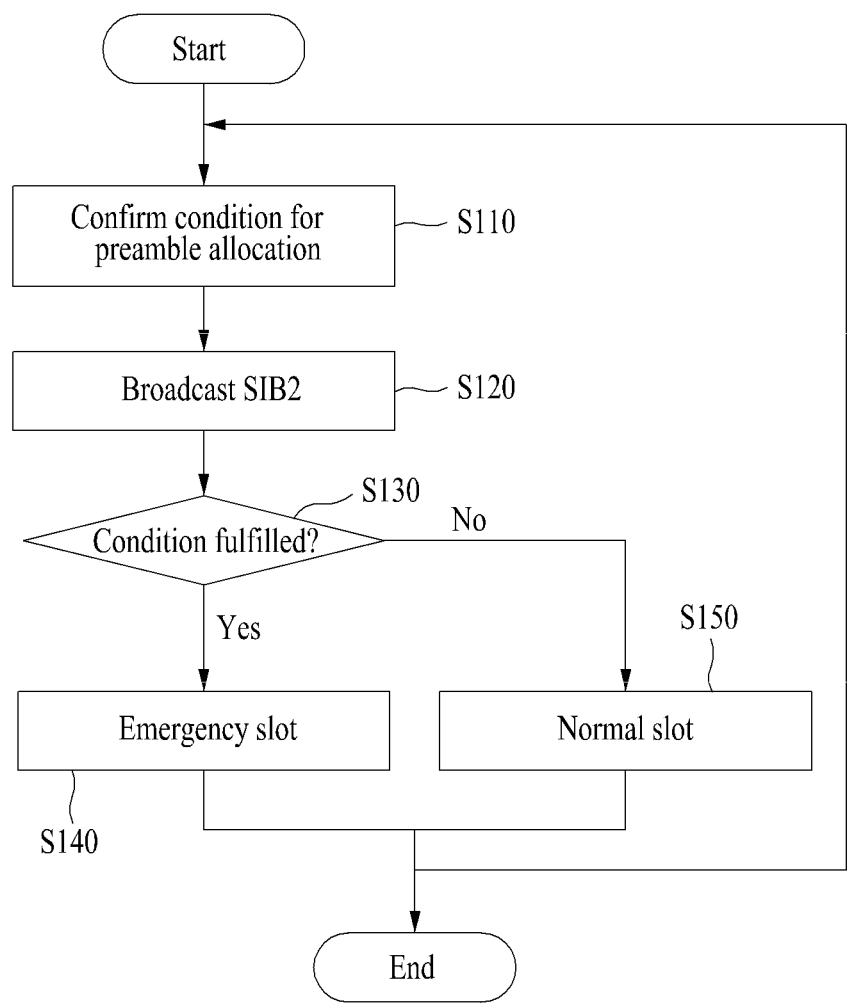
FIG. 3 is a flowchart for illustrating a mission-critical user priority-based random access method according to an embodiment.

FIG. 3 is a flowchart for illustrating an MCHP-RA method according to an embodiment.

Referring to FIG. 3, the MCHP-RA method according to an embodiment includes step S120 for an eNB to broadcast information as part of the SIB2 for the allocation of an RACH slot in the network environment in which a PS-LTE network and an LTE-M network coexist, step S140 for the eNB to select an emergency slot as a next RACH slot when the number of MCHP UEs is greater than a predefined threshold and to process the MCHP UEs during the random access procedure, and step S150 for the eNB to select a normal slot as a next RACH slot when the number of MCHP UEs is smaller than the predefined threshold and processing the MCHP UEs. In order to prevent a preamble collision, the eNB may allocate an RACH slot based on configurations.

Furthermore, the random access method may further include step S110 of configuring a condition for preamble allocation to the MCHP UEs.

Accordingly, in order to prevent a preamble collision, an eNB can allocate preambles while allocating an RACH slot based on configurations. An MCHP-RA method according to an embodiment is described as an example below.

The MCHP-RA method according to an embodiment may be described specifically using an MCHP-RA apparatus according to an embodiment.

Figure 4:
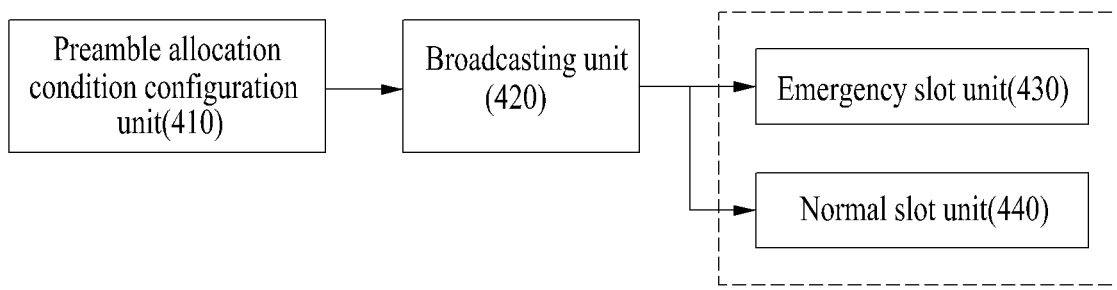
FIG. 4 is a block diagram of a mission-critical user priority-based random access apparatus according to an embodiment.

FIG. 4 is a block diagram of an MCHP-RA apparatus according to an embodiment.

Referring to FIG. 4, the MCHP-RA apparatus 400 according to an embodiment may include a broadcasting unit 420, an emergency slot unit 430 and a normal slot unit 440. Furthermore, in some embodiments, the MCHP-RA apparatus 400 may further include a preamble allocation condition configuration unit 410.

First, at step S110, the preamble allocation condition configuration unit 410 may configure a condition for preamble allocation to MCHP UEs. The preamble allocation condition configuration unit 410 may configure the condition for preamble allocation when the number of MCHP UEs successful in random access is greater than a predefined threshold for the number of MCHP UEs. Such a condition for preamble allocation is described more specifically with reference to Equation 5 below.

At step S120, the broadcasting unit 420 of an eNB may broadcast information as part of the SIB2 for the allocation of an RACH slot in the network environment in which a PS-LTE network and an LTE-M network coexist.

More specifically, the broadcasting unit 420 may check whether the SIB2 including an RACH configuration has been received whenever a UE starts a random access procedure. Thereafter, when the UE receives the SIB2, the broadcasting unit 420 may broadcast information as part of the SIB2 for the allocation of a next RACH slot based on current slot statistics.

Furthermore, the broadcasting unit 420 may mark an emergency flag as 1 by inserting 1 bit into the SIB2 for an emergency slot based on a specific pattern of the RACH slot, and may reserve at least two preambles for MCHP UEs within each RACH slot. The random access preamble pool for the MCHP UEs may be updated in a next RACH slot based on RACH slot statistics.

At step S130, the broadcasting unit 420 may confirm the condition for preamble allocation, and may selectively drive the emergency slot unit 430 or the normal slot unit 440. At step S140, the emergency slot unit 430 is for processing MCHP UEs during the random access procedure for the PS-LTE and LTE-M network coexistence. The emergency slot unit 430 may select an emergency slot as a next RACH slot when the number of MCHP UEs is greater than a predefined threshold, and may process the MCHP UEs during the random access procedure.

In this case, the MCHP UE may calculate the success probability of random access using a normal random access pool and an emergency random access pool, and may perform a contention-based random access procedure using a random access pool having a higher success probability of random access.

At step S150, the normal slot unit 440 may select a normal RACH slot as a next RACH slot because a given emergency flag is not marked when the number of MCHP UEs is smaller than the predefined threshold, and may process the MCHP UEs. The normal slot unit 440 may select a preamble based on 3GPP and transmit the selected preamble to the eNB in the normal RACH slot.

The MCHP-RA method and apparatus according to an embodiment are described more specifically below.

The MCHP-RA method is based on two major steps, such as the statistics of a current RACH slot and preamble allocation in a next RACH slot. The steps are logically dependent on each other, so the collision probability is reduced, the success probability is increased, and access delay is minimized. The details of the MCHP-RA method may be described as follows.

1) Statistics of Current RACH Slot

This step includes a condition for preamble allocation to MCHP UEs. Accordingly, statistics may be performed on a current RACH slot. In simulations, the first RACH slot may be allocated based on a normal random access procedure without given statistics. The condition for preamble allocation may be confirmed after the transmission of one RACH slot providing corresponding information or the statistics of the current RACH slot. The condition for preamble allocation may be represented in the following equation.

$$Nr.\text{ of MCHP UEs who are successful in } RA > MCHP_{Threshold} \quad \text{[Equation 5]}$$

In Equation 5, $MCHP_{Threshold}$ is a predefined threshold for the number of MCHP UEs.

When the condition is fulfilled, more preambles will be reserved for MCHP UEs in a next RACH slot. That is, it may be assumed that by checking the state from a current RACH slot, more or less MCHP UEs are an active state and are attempting contention-based random access in order to establish connections with a network. In the conventional technology including 3GPP proposals for random access, there is no method of being aware that an MCHP UE attempts to establish a connection with a network by attempting random access. The reason for this is that the process is only a random access process. A user attempts a success by randomly accessing a channel, so a network is unaware of whether a contenting user is a mission-critical user or a normal user. Accordingly, a difficult challenge or gap for the mission-critical user occurs during the random access process because there is no proposal available for the conventional technology. In order to fill up the gap, an embodiment of the present invention may establish a strategy, such as the statistics of a current RACH slot that provides approximately correct estimation for preamble allocation to MCHP UEs in a next RACH slot.

In accordance with the above-described condition of Equation 5, when the condition is fulfilled, more preambles will be reserved for MCHP UEs in a next RACH slot. In this way, a collision between the MCHP UEs during a random access procedure can be reduced.

Likewise, when the condition of Equation 5 is not fulfilled based on the statistics of the current RACH slot, preambles for the MCHP UEs may be reduced based on a predefined value. This process will continue based on the statistics of the current RACH slot. Accordingly, the allocation of preambles to MCHP UEs in a next RACH slot will reach up to a maximum or minimum predefined value.

2) Preamble Allocation in Next RACH Slot

This step includes an RACH procedure for a next slot, which means that this step is logically dependent on the former step. In simulations, the first slot is transmitted without statistics. After the transmission of the one slot, this step may perform a meaningful role on the contention of MCHP UEs during a random access procedure. Whether the SIB2 including an RACH configuration has been received may be checked whenever a user starts a random access procedure. An eNB may impose restrictions based on the statistics of a current slot by broadcasting information as part of the SIB2 for the allocation of a next RACH slot.

For clarity, the eNB may mark an emergency flag as 1 (0 by default) by inserting 1 bit into the SIB2 for an emergency slot based on a specific pattern of the RACH slot in order to represent the portion of random access preambles for the MCHP UEs. The RA preamble pool for the MCHP UEs may be updated in a next RACH slot based on RACH slot statistics. The eNB may reserve at least two preambles for MCHP UEs within each RACH slot. The reserved preambles for the MCHP UEs may be increased or decreased for a next RACH slot based on the statistics of a current RACH slot.

When the condition of Equation 5 is fulfilled, the eNB may add two more preambles to RA preambles reserved for the MCHP UEs when the emergency slot is marked. Accordingly, this process is repeated until the condition of Equation 5 is true. In contrast, when the condition of Equation 5 is not true based on the statistics of a current RACH slot, the eNB will not mark a given emergency flag. Accordingly, a next RACH slot will become a normal slot.

The preamble is selected based on the 3GPP specifications in a normal RACH slot. In the case of the emergency slot, the preambles may be allocated to MCHP UEs in a next RACH slot based on previous RACH slot statistics.

The MCHP UEs may calculate the success probability of RA using a normal RA pool or an emergency RA pool, and may perform a contention-based RA procedure using an RA pool having a higher success probability of RA. Accordingly, successful attempts can be significantly improved, a preamble collision can be reduced, and access delay for MCHP UEs can be minimized during a random access procedure.

Performance of the proposed MCHP-RA method according to embodiments is evaluated below. Performance of the proposed MCHP-RA method was compared with that of the conventional 3GPP random access method. In an embodiment of the present invention, the overlapped network of the PS-LTE and LTE-M networks and system-level simulations were performed in order to validate the effectiveness of the proposed MCHP-RA scheme.

Table 1 shows major simulation parameter.

TABLE 1

| PARAMETER | VALUE |
| --- | --- |
| Bandwidth | 10 MHz |
| PS-LTE eNB | 1 site/3 sectors |
|  | (Only 2 sectors are considered) |
| LTE-M the eNB | 1 site/2 sectors |
|  | (Only 1 sector is considered) |
| Height/RSRP of PS-LTE eNB | 790 m/−117dBm |
| Height/RSRP of LTE-M eNB | 350 m/−115dBm |
| Nr. of UEs | PS-LTE UEs:20 active |
|  | LTE-M UEs:50 active |
| RA Type | Contention-based Procedure |
| RA Preambles | 54 |
| Preamble Format | 3 |
| $MCHP_{Threshold}$ | 4 |
| Simulation Unit | TTI (3 msec) |

Performance of the MCHP-RA method proposed for the PS-LTE and LTE-M network coexistence is evaluated using important performance matrices, such as the number of successful attempts, the number of collisions, and access delay. Furthermore, the proposed MCHP-RA is evaluated by considering all UEs (MCHP UE+normal UE) in addition to MCHP UEs based on the above-described performance matrices.

Figure 5:
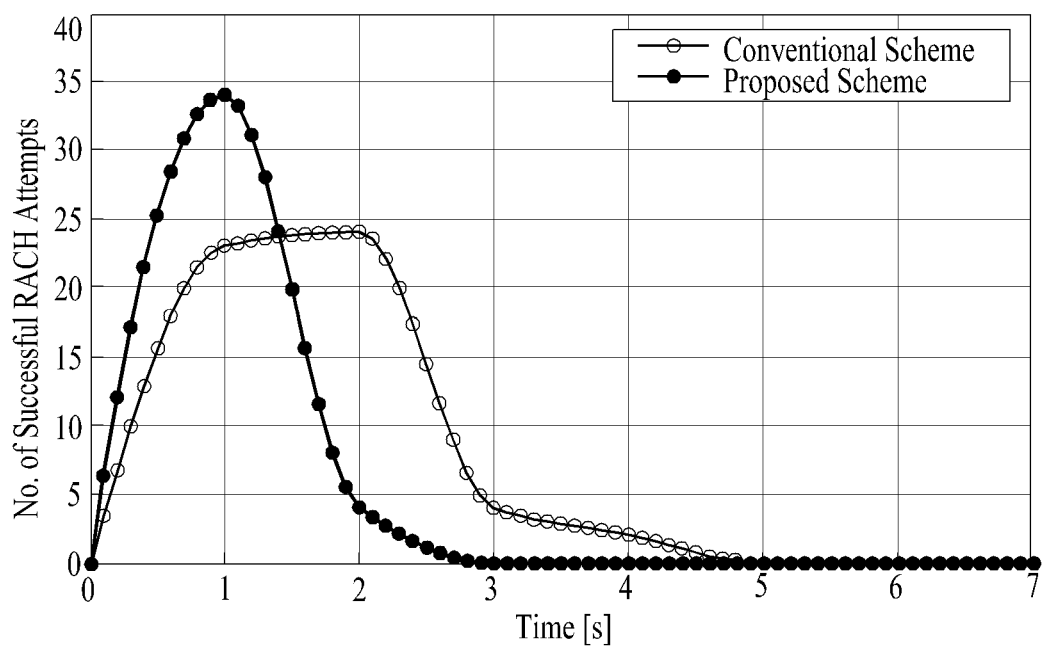
FIG. 5 is a diagram showing successful RACH attempts and the time of total users according to an embodiment.

FIG. 5 is a diagram showing successful RACH attempts and the time of total users according to an embodiment.

As shown in FIG. 5, a total time taken for all users to achieve successful RACH attempts is small compared to the conventional method. Furthermore, a maximum number for the successful RACH attempts is 34 in the proposed method according to an embodiment. In contrast, a maximum value is about 24 in the conventional method. Accordingly, the proposed method outperformed about 41.67% for achieving maximum successful RACH attempts.

Figure 6:
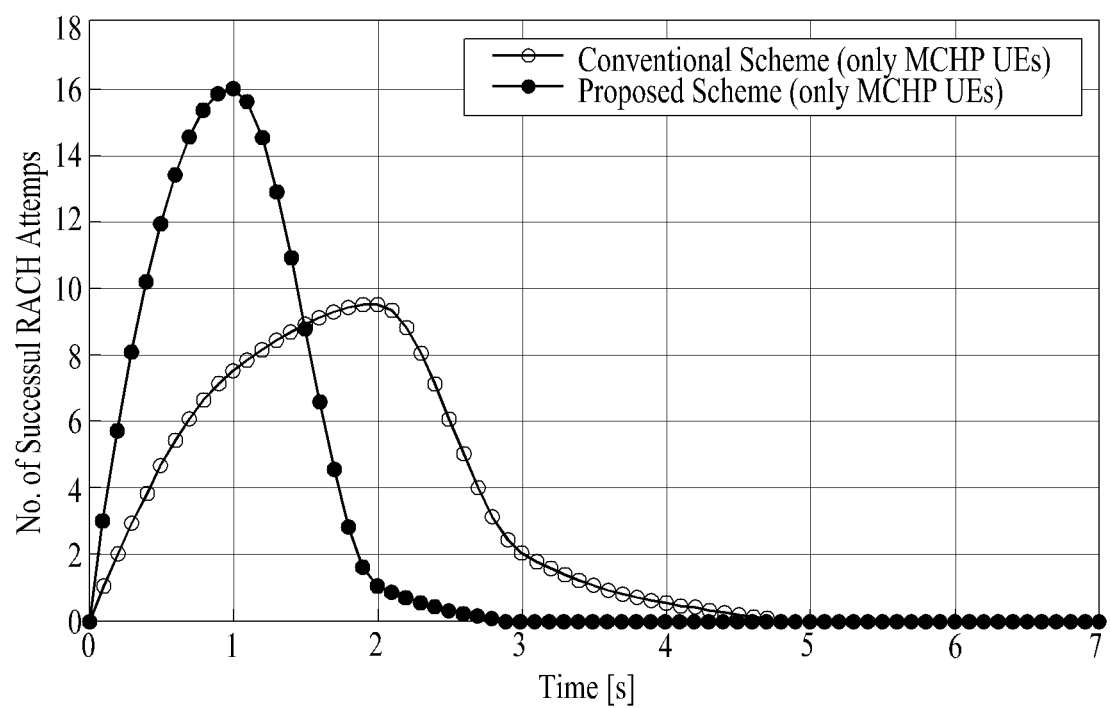
FIG. 6 is a diagram showing the successful RACH attempts of MCHP UEs versus times according to an embodiment.

FIG. 6 is a diagram showing the successful RACH attempts of MCHP UEs versus times according to an embodiment.

As shown in FIG. 6, a maximum number for successful RACH attempts is 16 in the proposed method, whereas a maximum value reaches up to about 9.5 in the conventional method. Accordingly, the proposed method outperformed about 68.4% for achieving the maximum successful RACH attempts. Accordingly, it may be seen that the proposed method is very effective for MCHP UEs.

Figure 7:
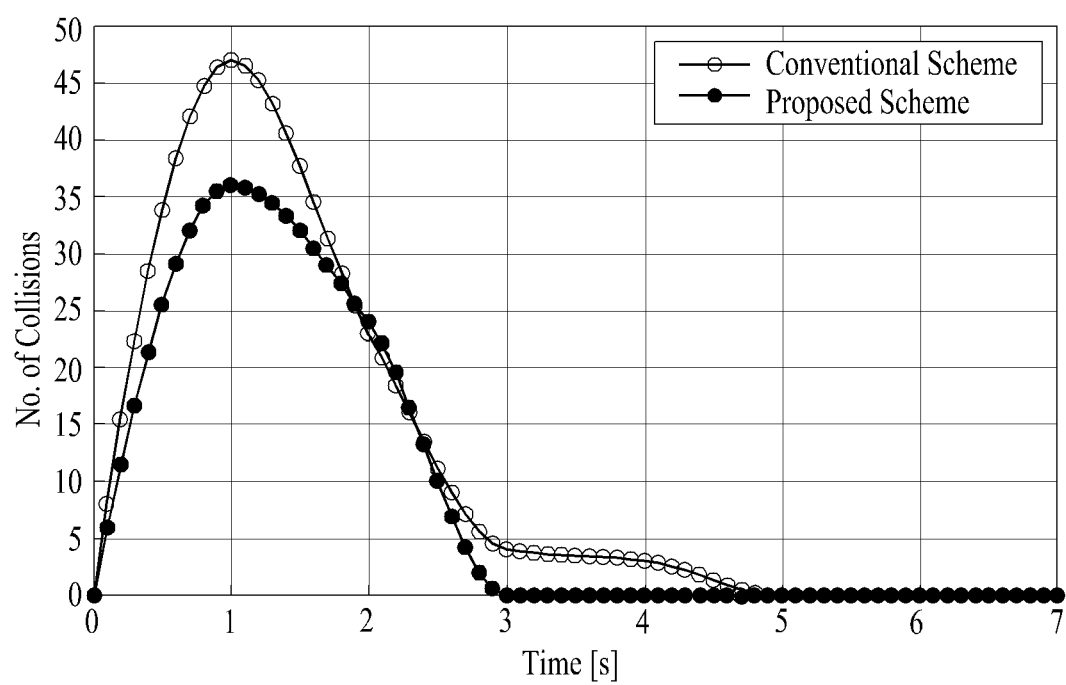
FIG. 7 is a diagram showing the time of total users versus collision times according to an embodiment.

FIG. 7 is a diagram showing the time of total users versus collision times according to an embodiment.

As shown in FIG. 7, the number of collisions in the proposed method is smaller than that of the conventional method due to a previous collision resolution method. Furthermore, a maximum number of collisions occurring in the conventional method are 47, whereas a maximum number of collisions in the proposed method decrease up to 36. Accordingly, the proposed method decreases the maximum number of collisions about 30.56%.

Figure 8:
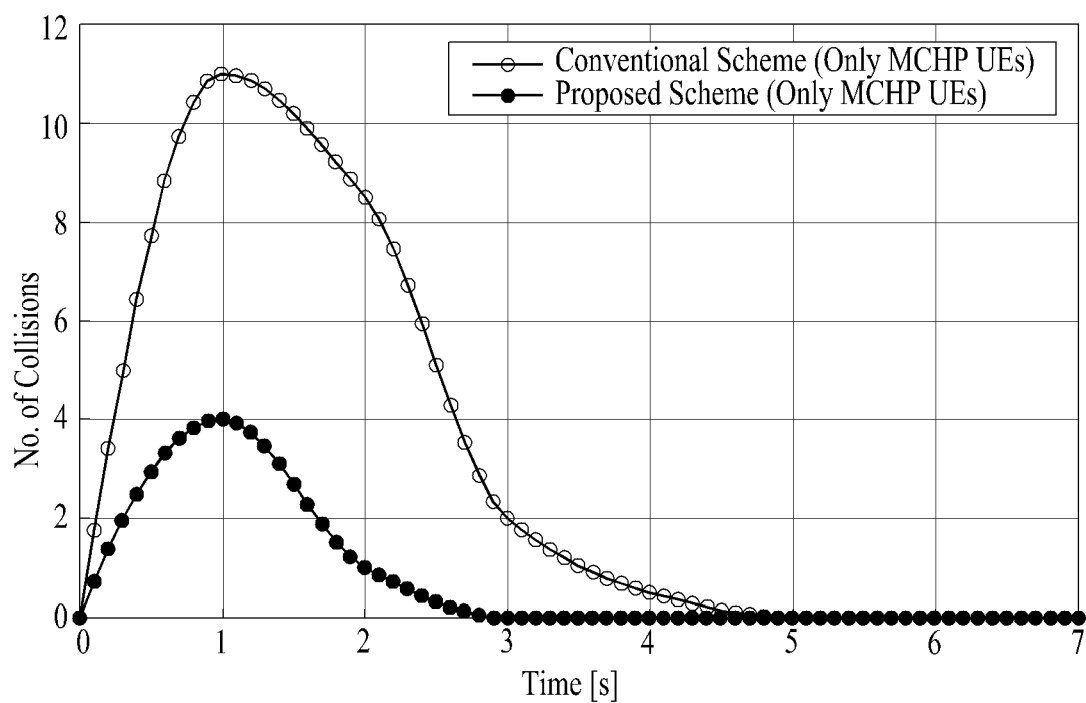
FIG. 8 is a diagram showing the number of collisions of MCHP UEs versus times according to an embodiment.

FIG. 8 is a diagram showing the number of collisions of MCHP UEs versus times according to an embodiment.

As shown in FIG. 8, a maximum number of collisions occurring in the conventional method are 11, whereas a maximum number of collisions in the proposed method decrease up to 4. Accordingly, the proposed method decreases the maximum number of collisions about 175%.

The MCHP-RA method may be analyzed based on measurement statistics. First, an optimal number for MCHP $UES_{threshold}$ is found using the condition of Equation 5, and the analytical model of the proposed MCHP-RA method is driven.

The condition of Equation 5 is very important in optimizing the performance of the proposed MCHP-RA method. Accordingly, it is necessary to find an optimal value of an MCHP UE threshold. If the optimal value of the MCHP UE threshold is not found, the following problems may be expected. (i) When the MCHP $UEs_{threshold}$ is set as a low value (e.g., 1), the number of emergency slots may be high. (ii) When the MCHP $UEs_{threshold}$ is set as a high value (e.g., 10), MCHP UEs may take more time to obtain success attempts. Accordingly, the MCHP UEs may encounter more collisions. In order to solve the problems, more simulations may be performed by setting different MCHP UE thresholds to find an optimal or adequate number of the MCHP $UES_{threshold}$. The optimal value may be found based on the number of successful RACH attempts, the number of collisions, and access delay.

Figure 9:
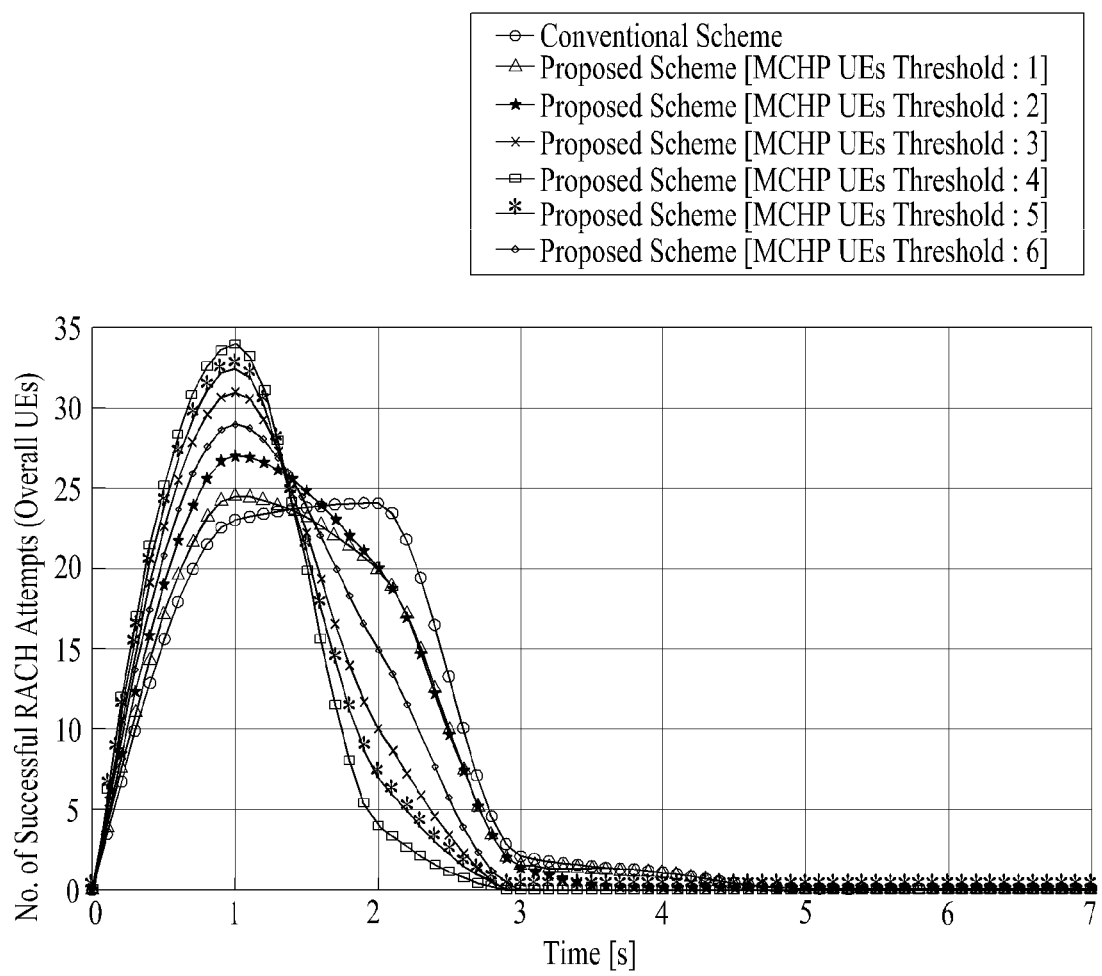
FIG. 9 is a diagram showing optimal MCHP UEs$_{threshold}$ for total UEs according to an embodiment.

FIG. 9 is a diagram showing optimal MCHP $UEs_{threshold}$ for total UEs according to an embodiment.

As shown in FIG. 9, the threshold value provides significant effects on the performance of the proposed method by setting a varying number for the MCPH UEs threshold. When the MCHP UE threshold is very low (e.g., 1), performance of the proposed method is almost identical with that of the conventional method. Successful attempt performance becomes better until the number for MCHP UEs threshold is 4. Thereafter, when the MCHP UE threshold is set higher than 4, it may be seen that the proposed performance falls back. Accordingly, a proper or optimal number for MCHP UEs is 4.

Figure 10:
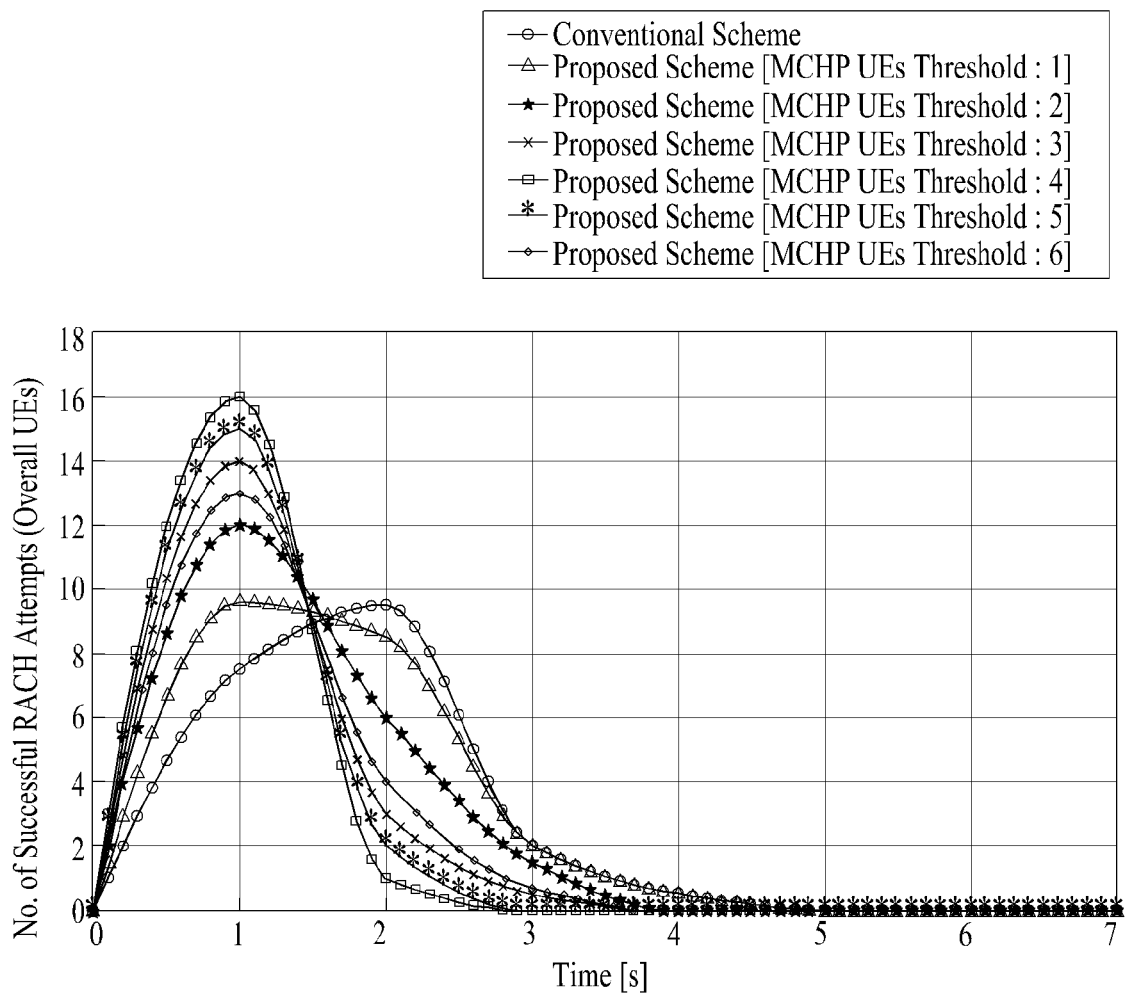
FIG. 10 is a diagram showing optimal MCHP UEs$_{threshold}$ for MCHP UEs according to an embodiment.

FIG. 10 is a diagram showing optimal MCHP $UES_{threshold}$ for MCHP UEs according to an embodiment.

From FIG. 10, it may be clearly seen that if only MCHP UEs have successfully attempted RACHs, the performance of the proposed method is the same as that of the conventional method when a lower MCHP UE threshold (e.g., 1) is set. Accordingly, an adequate or optimal number for the MCHP UE threshold is 4.

In accordance with the embodiments, the number of successful RACH attempts can be improved, the number of collisions can be reduced, and access delay according to the coexistence of the PS-LTE network and an LTE-M network can be minimized.

The above-described apparatus may be implemented as a hardware component, a software component and/or a combination of them. For example, the apparatus and components described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. The processing apparatus may perform an operating system (OS) and one or more software applications executed on the OS. Furthermore, the processing apparatus may access, store, manipulate, process and generate data in response to the execution of software. For convenience of understanding, one processing apparatus has been illustrated as being used, but a person having ordinary skill in the art may understand that the processing apparatus may include a plurality of processing elements and/or a plurality of types of processing elements. For example, the processing apparatus may include a plurality of processors or a single processor and a single controller. Furthermore, other processing configurations, such as a parallel processor, are also possible.

Software may include a computer program, code, an instruction or a combination of one or more of them and may configure the processing apparatus to operate as desired or may instruct the processing apparatus independently or collectively. Software and/or data may be embodied in any type of a machine, component, physical device, virtual equipment or computer storage medium or device in order to be interpreted by the processing apparatus or to provide an instruction or data to the processing apparatus. Software may be distributed to computer systems connected over a network and may be stored or executed in a distributed manner. Software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may have been known to those skilled in the computer software. The computer-readable recording medium includes a hardware device specially configured to store and execute the program instruction, for example, magnetic media such as a hard disk, a floppy disk and a magnetic tape, optical media such as CD-ROM and a DVD, magneto-optical media such as a floptical disk, ROM, RAM, and flash memory. Examples of the program instruction may include high-level language code executable by a computer using an interpreter in addition to machine-language code, such as code written by a compiler.

In accordance with the embodiments, there can be provided the MCHP-RA method and apparatus for a collision resolution in a coexisting PS-LTE and LTE-M network, wherein RA preambles can be efficiently allocated to multiple MCHP UEs in order to prevent a preamble collision when the MCHP UEs attempt access for the network coexistence of the PS-LTE network and the LTE-M network.

Furthermore, in accordance with the embodiments, there can be provided the MCHP-RA method and apparatus for a collision resolution in a coexisting PS-LTE and LTE-M network, which can improve the number of successful RACH attempts, can reduce the number of collisions, and can minimize access delay according to the coexistence of the PS-LTE network and the LTE-M network.

As described above, although the embodiments have been described in connection with the limited embodiments and drawings, those skilled in the art may modify and change the embodiments in various ways from the description. For example, proper results may be achieved although the above-described descriptions are performed in order different from that of the described method and/or the above-described elements, such as the system, configuration, device, and circuit, are coupled or combined in a form different from that of the described method or replaced or substituted with other elements or equivalents.

Accordingly, other implementations, other embodiments, and equivalents of the claims belong to the scope of the claims.

What is claimed is:

1. A mission-critical user priority-based random access method, comprising:
    broadcasting information as part of a system information block (SIB) 2 in order for an eNB to allocate a random access channel (RACH) slot in a network environment in which an LTE-based public safety (PS-LTE) network and an LTE-based marine (LTE-M) network coexist;
    selecting an emergency slot as a next RACH slot when a number of mission-critical high priority-based user equipments (MCHP UEs) is greater than a predefined threshold and processing the MCHP UEs during a random access procedure; and
    selecting a normal slot as a next RACH slot when the number of MCHP UEs is smaller than a predefined threshold and processing the MCHP UEs,
    wherein the eNB allocates the RACH slot based on configurations in order to prevent a preamble collision.

2. The random access method of claim 1, wherein broadcasting information as part of a system information block (SIB) 2 in order for an eNB to allocate a random access channel (RACH) slot comprises:
    checking whether the MCHP UE has received the SIB2 comprising an RACH configuration whenever the UE starts a random access procedure; and
    broadcasting the information as part of the SIB2 in order to allocate a next RACH slot based on current slot statistics when the UE receives the SIB2.

3. The random access method of claim 1, wherein broadcasting information as part of a system information block (SIB) 2 in order for an eNB to allocate a random access channel (RACH) slot comprises:
    marking an emergency flag as 1 by inserting 1 bit into the SIB2 for the emergency slot based on a specific pattern of the RACH slot;
    reserving at least two preambles for MCHP UEs within each RACH slot; and
    updating the random access preamble pool for the MCHP UEs in a next RACH slot based on RACH slot statistics.

4. The random access method of claim 1, further comprising configuring a condition for preamble allocation to the MCHP UEs,
    Wherein configuring a condition for preamble allocation to the MCHP UEs comprises configuring the condition for preamble allocation when a number of MCHP UEs successful in random access is greater than a predefined threshold for the number of MCHP UEs.

5. A mission-critical user priority-based random access apparatus, comprising:
    a broadcasting unit configured to broadcast information as part of a system information block (SIB) 2 in order for an eNB to allocate a random access channel (RACH) slot in a network environment in which an LTE-based public safety (PS-LTE) network and an LTE-based marine (LTE-M) network coexist;
    an emergency slot unit configured to select an emergency slot as a next RACH slot when a number of mission-critical high priority-based user equipments (MCHP UEs) is greater than a predefined threshold and process the MCHP UEs during a random access procedure; and
    a normal slot unit configured to select a normal slot as a next RACH slot when the number of MCHP UEs is smaller than a predefined threshold and processing the MCHP UEs,
    wherein the eNB allocates the RACH slot based on configurations in order to prevent a preamble collision.

6. The random access apparatus of claim 5, further comprising a preamble allocation condition configuration unit configured to configure a condition for preamble allocation to the MCHP UEs,
    wherein configuring a condition for preamble allocation to the MCHP UEs comprises configuring the condition for preamble allocation when a number of MCHP UEs successful in random access is greater than a predefined threshold for the number of MCHP UEs.

* * * * *